United States Patent
Sakaida et al.

(10) Patent No.: US 10,165,136 B2
(45) Date of Patent: Dec. 25, 2018

(54) CONTROL DEVICE, ELECTRONIC APPARATUS, NON-TRANSITORY COMPUTER READABLE MEDIUM, AND CONTROL METHOD

(71) Applicant: FUJI XEROX Co., Ltd., Minato-ku, Tokyo (JP)

(72) Inventors: Hiroshi Sakaida, Kanagawa (JP); Satoshi Maruyama, Kanagawa (JP); Yohei Makino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 201 days.

(21) Appl. No.: 14/878,097

(22) Filed: Oct. 8, 2015

(65) Prior Publication Data
US 2016/0381237 A1  Dec. 29, 2016

(30) Foreign Application Priority Data

Jun. 24, 2015 (JP) .................................. 2015-126611

(51) Int. Cl.
H04N 1/00 (2006.01)
(52) U.S. Cl.
CPC ..... *H04N 1/00437* (2013.01); *H04N 1/00416* (2013.01)
(58) Field of Classification Search
None
See application file for complete search history.

(56) References Cited

U.S. PATENT DOCUMENTS

| 8,503,010 | B2 | 8/2013 | Satake | |
| 2001/0018738 | A1* | 8/2001 | Mori | G06F 9/44505 713/100 |
| 2006/0129947 | A1* | 6/2006 | Hamzy | G06F 9/4443 715/790 |
| 2007/0142952 | A1* | 6/2007 | Yamamoto | G05B 23/027 700/110 |
| 2012/0001748 | A1* | 1/2012 | Ladouceur | H04M 1/72544 340/500 |

(Continued)

FOREIGN PATENT DOCUMENTS

JP 2007-102751 A 4/2007
JP 2010-108304 A 5/2010

*Primary Examiner* — John R Wallace
(74) *Attorney, Agent, or Firm* — Sughrue Mion, PLLC

(57) ABSTRACT

A control device includes a setting unit, an accumulation unit, a registration unit, and a selecting unit. The setting unit sets image data expressing an image including a first layer corresponding to a foreground-operating application and a second layer located in front of the first layer in a viewing direction. The accumulation unit accumulates information related to a screen corresponding to the second layer requested for display from an application and for which the display is not completed. The registration unit registers, for each application, a rule to be applied when selecting any of screens corresponding to the accumulated information. The selecting unit selects a screen corresponding to the second layer in accordance with the rule of the foreground-operating application among the registered rules if display of the screen corresponding to the second layer is requested from an application and that commands the setting unit to set selected-screen-containing image data.

13 Claims, 10 Drawing Sheets

(56) References Cited

U.S. PATENT DOCUMENTS

| | | | | |
|---|---|---|---|---|
| 2012/0075327 A1* | 3/2012 | MacKenzie | ............ | G06F 3/0481 345/589 |
| 2013/0346521 A1* | 12/2013 | Arabo | ............... | H04L 29/08693 709/206 |
| 2015/0089443 A1* | 3/2015 | Lee | ..................... | G06F 3/04886 715/789 |

* cited by examiner

FIG. 10A

| REQUEST SOURCE | TIME OF OCCURRENCE | PRIORITY LEVEL | CHARACTER STRING |
|---|---|---|---|
| COPY APPLICATION | 7:29 | 3 | PLEASE SUPPLY SHEETS. |
| SCAN APPLICATION | 7:30 | 3 | COVER IS OPEN. |
|  |  |  |  |

FIG. 10B

| REQUEST SOURCE | TIME OF OCCURRENCE | PRIORITY LEVEL | CHARACTER STRING |
|---|---|---|---|
| COPY APPLICATION | 7:39 | 3 | PLEASE SUPPLY TONER. |
|  |  |  |  |
|  |  |  |  |

FIG. 10C

| REQUEST SOURCE | TIME OF OCCURRENCE | PRIORITY LEVEL | CHARACTER STRING |
|---|---|---|---|
| COPY APPLICATION | 7:39 | 3 | PLEASE SUPPLY TONER. |
| SCAN APPLICATION | 7:40 | 3 | PLEASE REMOVE JAMMED SHEET. |
|  |  |  |  |

FIG. 10D

| REQUEST SOURCE | TIME OF OCCURRENCE | PRIORITY LEVEL | CHARACTER STRING |
|---|---|---|---|
| COPY APPLICATION | 7:39 | 3 | PLEASE SUPPLY TONER. |
| SCAN APPLICATION | 7:40 | 3 | PLEASE REMOVE JAMMED SHEET. |
| COPY APPLICATION | 7:41 | 5 | PLEASE SUPPLY SHEETS. |

CONTROL DEVICE, ELECTRONIC APPARATUS, NON-TRANSITORY COMPUTER READABLE MEDIUM, AND CONTROL METHOD

CROSS-REFERENCE TO RELATED APPLICATIONS

This application is based on and claims priority under 35 USC 119 from Japanese Patent Application No. 2015-126611 filed Jun. 24, 2015.

BACKGROUND

Technical Field

The present invention relates to control devices, electronic apparatuses, non-transitory computer readable media, and control methods.

SUMMARY

According to an aspect of the invention, there is provided a control device including a setting unit, an accumulation unit, a registration unit, and a selecting unit. The setting unit sets image data expressing an image including a first layer corresponding to an application operating in foreground and a second layer located in front of the first layer in a viewing direction. The accumulation unit accumulates information related to a screen that corresponds to the second layer requested for display from an application and for which the display is not completed. The registration unit registers, for each application, a rule to be applied when selecting any of screens corresponding to the information accumulated in the accumulation unit. The selecting unit selects a screen corresponding to the second layer in accordance with the rule of the application operating in the foreground among the rules registered in the registration unit if display of the screen corresponding to the second layer is requested from an application and commands the setting unit to set image data containing the selected screen.

BRIEF DESCRIPTION OF THE DRAWINGS

An exemplary embodiment of the present invention will be described in detail based on the following figures, wherein:

FIGS. 10A to 10D each illustrate a candidate list;

FIG. 14 is a sequence diagram illustrating an operation performed when the power of the copier is turned on;

DETAILED DESCRIPTION

First, the background of an exemplary embodiment of the present invention will be described. In the following description, the term "application" refers to an application program. A technology for causing an electronic apparatus that concurrently executes multiple applications to simultaneously display multiple screens corresponding to the respective applications is known. However, in a case where it is difficult to simultaneously display multiple screens due to a display surface having a relatively small area, as in, for example, a copier or a smartphone, the display is performed by selecting any of the screens.

The selection of a screen to be displayed is performed by selecting an application to be operated by a user or is performed by the electronic apparatus in response to a request from an application. As the latter example, there may be a case where a second application requests display of an error screen during a process for displaying an error screen of a first application (i.e., a screen notifying that an error has occurred) or a case where the second application requests display of an error screen while an error screen of the first application is being displayed. There are examples where a rule for screen selection is set at the application side. However, since this rule varies from application to application, if multiple applications request display of error screens, there is a possibility that a screen to be displayed is not settable. Although a configuration that selects a screen by causing the applications to operate in cooperation with each other is also conceivable, such a configuration leads to complicated applications. If the rule for screen selection is fixed at the electronic apparatus side, the rules at the application side become ineffective.

Next, an example of an exemplary embodiment of the present invention will be described.

Configuration

Figure 1:
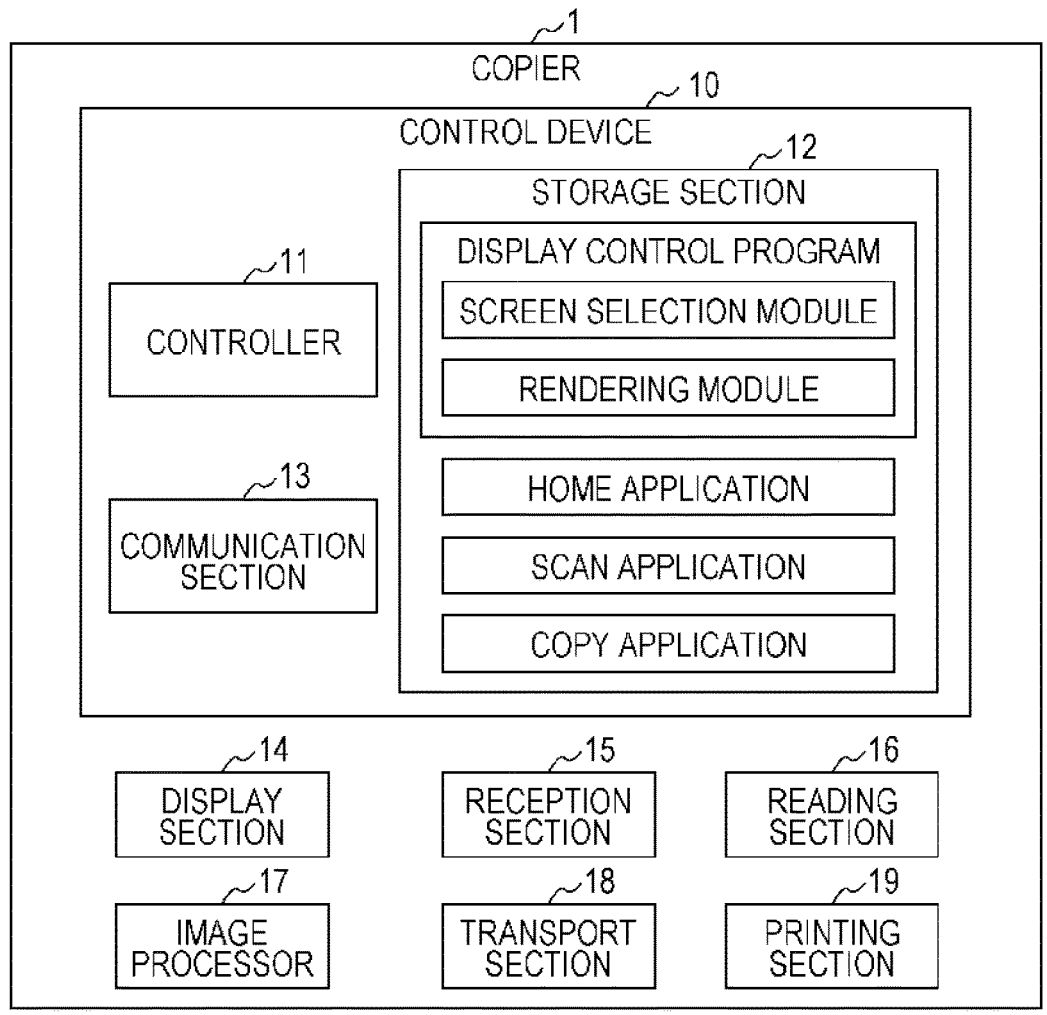
FIG. 1 illustrates a hardware configuration of a copier.

FIG. 1 illustrates a hardware configuration of a copier 1. The copier 1 is an example of an electronic apparatus according to an exemplary embodiment of the present invention. The copier 1 includes a controller 11, a storage section 12, a communication section 13, a display section 14, a reception section 15, a reading section 16, an image processor 17, a transport section 18, and a printing section 19. The controller 11, the storage section 12, and the communication section 13 constitute a control device 10. The control device 10 may alternatively be an external device of the copier 1, and the control device 10 and the copier 1 may be connected to each other by a communication unit. In this case, the display section 14 and the reception section 15 may be provided in the control device 10.

The controller 11 includes an arithmetic device, such as a central processing unit (CPU), and storage devices, such as a read-only memory (ROM) and a random access memory (RAM). The ROM stores firmware that describes a procedure for activating hardware as well as an operating system (OS). The RAM is used for storing data to be used by the CPU when executing calculation. The storage section 12 includes, for example, a semiconductor memory or a hard disk storage device and stores software, such as the OS and applications. The communication section 13 includes a communication interface (I/F) for communicating with an external electronic apparatus. The communication section 13 is connected to a communication line, such as a local area network (LAN).

The display section 14 includes, for example, a liquid crystal display device and has a display surface on which a screen to be used by a user for operating the copier 1 is displayed. The reception section 15 includes, for example, a touchscreen that covers the display surface of the display section 14 and a keyboard provided at a position adjacent to the display surface. The reception section 15 receives user operation and outputs a signal according to the operation to the controller 11. The controller 11 controls the copier 1 in accordance with the contents of this operation.

The reading section 16 generates image data by optically reading a document. The reading section 16 is, for example, an image scanner including platen glass, a light source, an optical system, a color filter, and an imaging element. The light source radiates light onto a document placed on the platen glass, and reflection light reflected by the document enters the imaging element via the optical system and the color filter. The imaging element converts the received light into an image signal and outputs the image signal to the image processor 17.

The image processor 17 performs image processing, such as screen processing and color conversion, on the image signal output from the reading section 16 so as to generate raster data. The transport section 18 picks up print sheets (which will be referred to as "sheets" hereinafter) one-by-one from a sheet container (not shown), which accommodates the sheets, and transports each sheet along a transport path (not shown). The printing section 19 prints an image based on the raster data generated by the image processor 17 onto each transported sheet. The printing method by the printing section 19 is, for example, an electrophotographic method or an inkjet method.

The storage section 12 stores applications, such as a display control program, a home application, a scan application, and a copy application. Although the display control program is one of the applications, the applications (such as the home application, the scan application, and the copy application) other than the display control program will be referred to as "applications" in the following description so as to differentiate the display control program from the remaining applications. Because the display control program and the applications are executed by the controller 11, the operation of the copier 1 is mostly executed by the controller 11. For the sake of convenience, the operation of the display control program (and modules thereof) and the applications will be described below.

Figure 2:
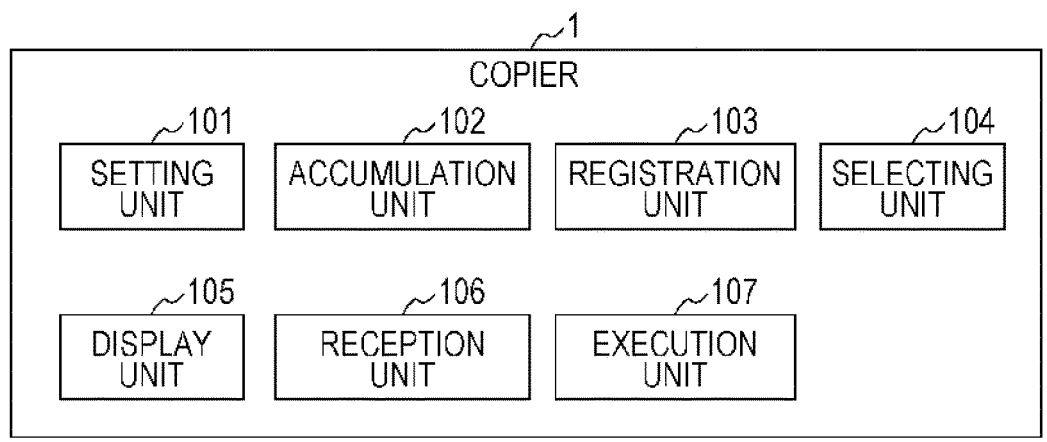
FIG. 2 is a block diagram illustrating the functions of an electronic apparatus according to an exemplary embodiment of the present invention.

FIG. 2 is a block diagram illustrating the functions of the electronic apparatus according to the exemplary embodiment of the present invention. These functions are realized by the controller 11 executing the display control program. A setting unit 101 sets image data expressing an image including a first layer corresponding to an application operating in the foreground and a second layer located in front of the first layer in a viewing direction. An accumulation unit 102 accumulates information related to a screen that corresponds to the second layer requested to be displayed from an application and that is not completely displayed yet. A registration unit 103 registers, for each application, a rule to be applied when selecting any of screens corresponding to the information accumulated in the accumulation unit 102. If there is a request for displaying a screen corresponding to the second layer from an application, a selecting unit 104 selects the screen corresponding to the second layer in accordance with the rule of the application operating in the foreground among the rules registered in the registration unit 103, and commands the setting unit 101 to set image data containing the selected screen. A display unit 105 displays the screen based on the image data set by the setting unit 101. A reception unit 106 receives operation on the screen displayed by the display unit 105. An execution unit 107 executes a process in accordance with the operation received by the reception unit 106. A specific configuration for realizing these functions will be described.

The display control program is a program for realizing a function of controlling display of a graphical user interface (GUI) screen of an application. The display control program includes a first routine, a screen selection module, and a rendering module. The screen selection module is for realizing a function of selecting a screen to be displayed. When a request (which will be referred to as "display request" hereinafter) for displaying a screen is received from an application, the screen selection module selects a screen to be displayed and commands the rending module to render the selected screen. The rendering module is for realizing a rendering function. The rendering module stores image data into an image-data storage area in accordance with the command from the screen selection module. The display surface of the display section 14 displays an image based on the image data stored in the image-data storage area. Detailed descriptions of these modules will be provided later.

The home application is for realizing a function of receiving operation for designating an application to be operated by the user (which will be referred to as "operable subject" hereinafter). When the power of the copier 1 is turned on, the OS is started, and then the display control program, the home application, the scan application, and the copy application are started. When the initialization of the copier 1 is completed, the home application sends a display request for a home screen to the screen selection module. The screen selection module selects the home screen as a screen to be displayed and commands the rendering module to render the home screen.

Figure 3:
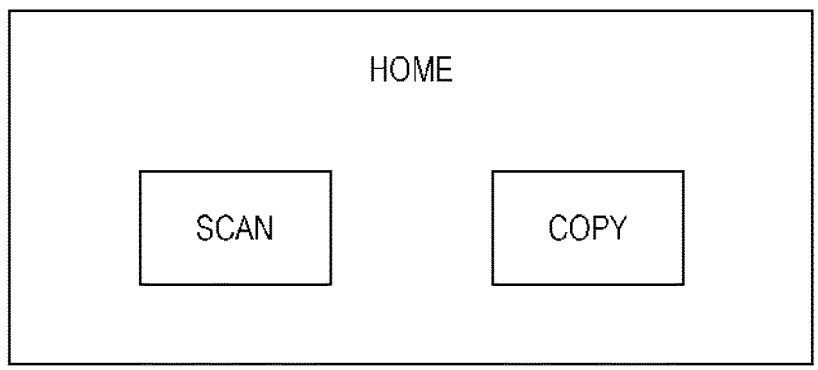
FIG. 3 illustrates a home screen.

FIG. 3 illustrates the home screen. The home screen has disposed therein buttons (virtual operators) associated with the scan application and the copy application. When one of the buttons is operated, a screen for operating the application associated with that button is displayed. An application in an operation-receivable state as a result of the displaying of the screen is referred to as "operable-subject application". In other words, an application operating in the foreground is the operable-subject application, whereas an application operating in the background is a non-operable-subject application. The scan button is for designating the scan application as an operable subject. The copy button is for designating the copy application as an operable subject. When the home screen is being displayed, the home application is the operable-subject application.

The scan application is for realizing a document reading function. When the scan button is operated on the home screen, the scan application sends a display request for a scan setting screen to the screen selection module. The screen selection module selects the scan setting screen as a screen to be displayed and commands the rendering module to render the scan setting screen.

Figure 4:
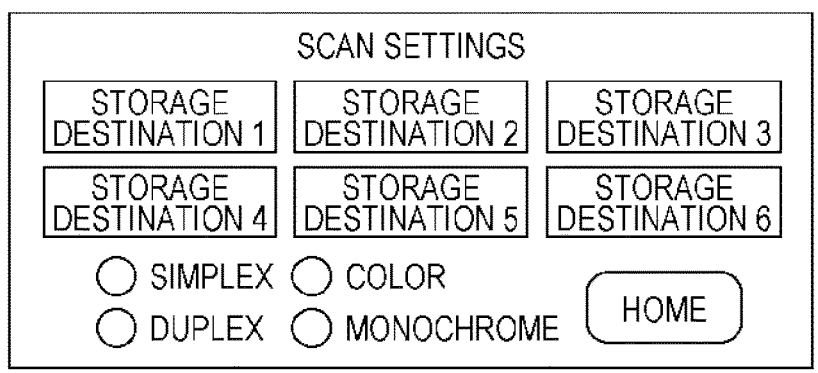
FIG. 4 illustrates a scan setting screen.

FIG. 4 illustrates the scan setting screen. The scan setting screen is for operating the scan application and specifically has widgets disposed therein for setting, for example, document reading conditions and storage destinations for generated image data. In addition, the scan setting screen has a button disposed therein for designating the home application as an operable subject. When the home button is operated, the scan application sends a display request for the home screen to the screen selection module. The screen selection module selects the home screen as a screen to be displayed and commands the rendering module to render the home screen.

When an error occurs in the scan application, the scan application sends a display request for a scan error screen to the screen selection module.

Figure 5:
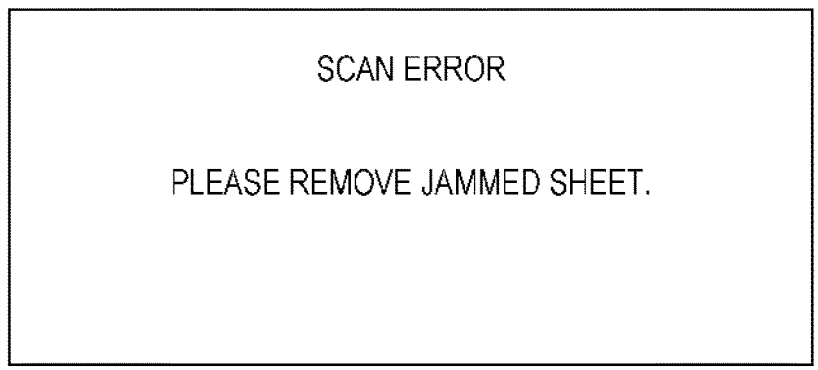
FIG. 5 illustrates an example of a scan error screen.

FIG. 5 illustrates an example of the scan error screen. In this example, the scan error screen notifies that a sheet is jammed in a transport path of a document feed device (i.e., a device that feeds a document onto the platen glass) (not shown) and displays an error message "please remove jammed sheet".

Figure 6:
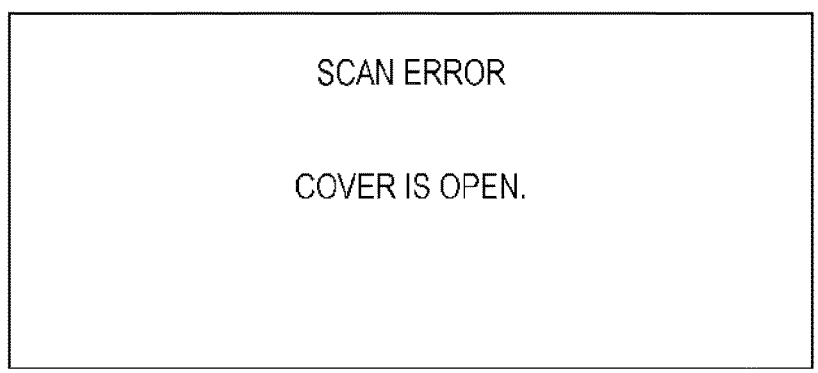
FIG. 6 illustrates another example of the scan error screen.

FIG. 6 illustrates another example of the scan error screen. In this example, the scan error screen notifies that a cover for the document feed device is open and displays an error message "cover is open". When the user opens the cover to remove a jammed sheet, this screen is displayed.

The copy application is for realizing a document copying function. When the copy button is operated on the home screen, the copy application sends a display request for a copy setting screen to the screen selection module. The screen selection module selects the copy setting screen as a screen to be displayed and commands the rendering module to render the copy setting screen. The copy setting screen is for operating the copy application and specifically has widgets (not shown) disposed therein for setting, for example, document reading conditions and image printing conditions. Similar to the scan setting screen, the copy setting screen also has a home button disposed therein.

When an error related to the copy application occurs, the copy application sends a display request for a copy error screen to the screen selection module.

Figure 7:
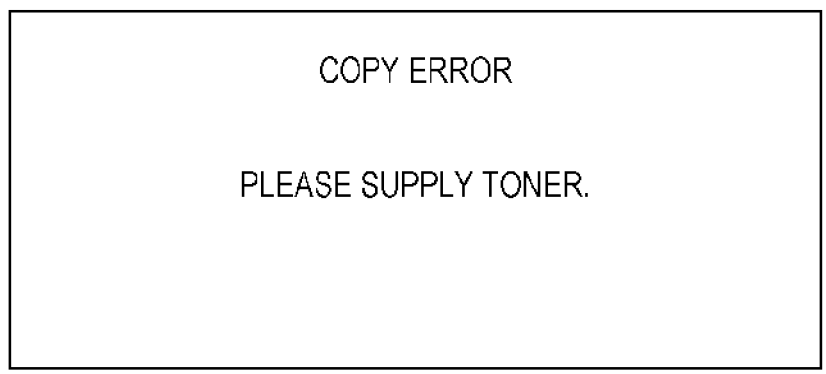
FIG. 7 illustrates an example of a copy error screen.

FIG. 7 illustrates an example of the copy error screen. In this example, the copy error screen notifies that there is not enough toner for the printing section 19 to print an image and displays an error message "please supply toner".

Figure 8:
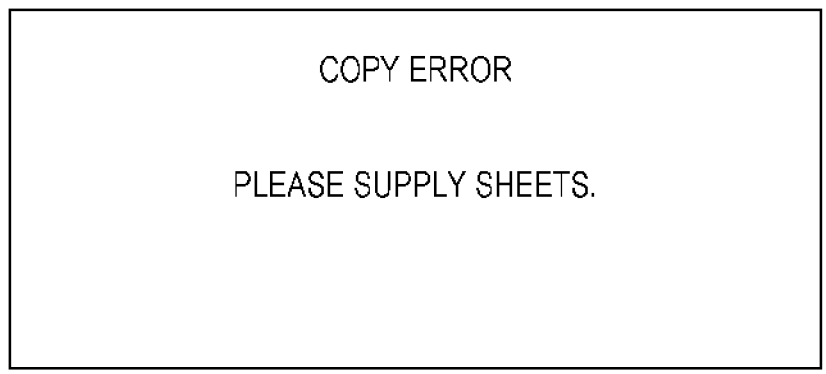
FIG. 8 illustrates another example of the copy error screen.

FIG. 8 illustrates another example of the copy error screen. In this example, the copy error screen notifies that the sheet container is empty and displays an error message "please supply sheets".

If a sheet becomes jammed in the transport path of the transport section 18 or in the transport path of the document feed device, a screen similar to FIG. 5 is displayed. Furthermore, when the user opens the cover to remove a jammed sheet, a screen similar to FIG. 6 is displayed.

Next, the screen selection module will be described. This configuration is an example of the selecting unit 104. When the screen selection module receives a display request for a screen from an application, the screen selection module selects a screen to be displayed and commands the rendering module to render the selected screen. The layers will now be described.

Figure 9:
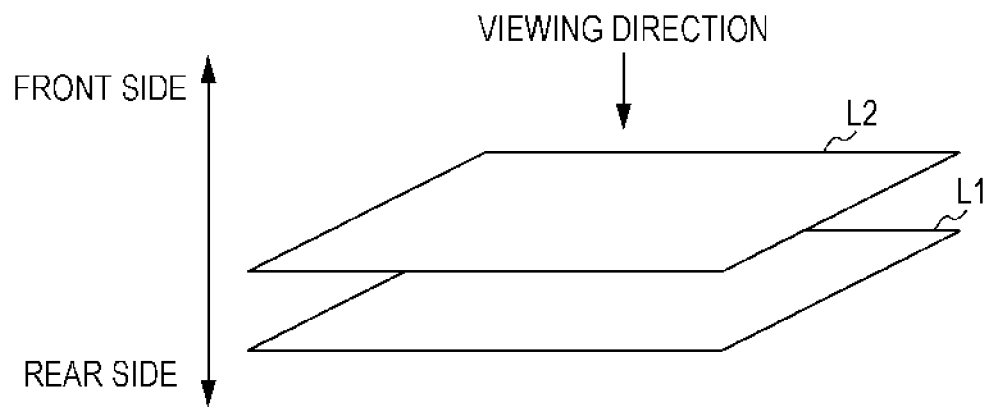
FIG. 9 illustrates the concept of layering.

FIG. 9 illustrates the concept of layering. The layers constitute a virtual layer structure in the display of a screen. The number of layers is not limited so long as there are multiple layers. This exemplary embodiment will be described with reference to an example where there are two layers. In the direction in which the display surface of the display section 14 is viewed, the layer at the rear side will be referred to as "first layer L1", and the layer at the front side will be referred to as "second layer L2". The shape and area of each layer are identical to those of the display surface.

If the screen selection module receives a display request for a screen from an application, the screen selection module determines a layer corresponding to the type of the screen. A correspondence relationship between the types of screens and the layers is set in advance. A layer corresponding to the home screen, the scan setting screen, and the copy setting screen is the first layer L1. A layer corresponding to the error screens (such as the scan error screen and the copy error screen to be described later) is the second layer L2. In other words, the first layer L1 is a layer corresponding to a screen for operating an operable-subject application (i.e., a layer corresponding to the application operating in the foreground), and the second layer L2 is a layer corresponding to a screen to be displayed by priority over the first layer L1.

When each application is to send a display request for a screen corresponding to the second layer L2 to the screen selection module, the application generates screen information related to that screen and sends the generated screen information together with the display request to the screen selection module. This screen information includes, for example, request-source information, time-of-occurrence information, priority information, and character-string information. The request-source information indicates an application that has sent a display request. The time-of-occurrence information indicates the time at which a display request is made. The priority information indicates a level of priority for displaying a screen. A level of priority for displaying a screen is, for example, one of multiple preset levels of priority, and a level of priority according to each type of screen is set in advance to an application code. An application generates the priority information indicating the level of priority according to the type of screen requested to be displayed. For example, in this exemplary embodiment, five levels of priority from 1 to 5 are set, and level 5 is set to be the highest priority. The character-string information indicates a character string (for example, see FIG. 5) to be disposed on a screen.

FIGS. 10A to 10D each illustrate a candidate list. This configuration is an example of the accumulation unit 102. The candidate list is stored in the storage section 12. The candidate list accumulates screen information received from applications. When the screen selection module receives a display request for a screen corresponding to the second layer L2 and screen information from an application, the screen selection module adds the screen information to the candidate list. The screen selection module selects a screen based on the screen information written in the candidate list and commands the rendering module to render the selected screen. Furthermore, when the screen is completed displayed, the screen selection module deletes the screen information corresponding that screen from the candidate list. In other words, a state where screen information corresponding to a certain screen is written in the candidate list continues from when a display request for that screen is received to when that screen is completely displayed. When a new display request for a screen is received, the screen selection module adds screen information of that screen to the candidate list.

Next, a screen selection process will be described. For each application, the screen selection module registers a rule for selecting a screen in the second layer L2 (which will be referred to as "screen selection rule" hereinafter). Specifically, each application contains a callback that describes a screen selection rule in the second layer L2. When the display control program and the applications start after the power is turned on, each application sends a reference of the callback contained therein to the screen selection module of the display control program. The screen selection module registers these references in correspondence with the applications. This configuration is an example of the registration unit 103.

When any of the applications is designated as an operable subject, the screen selection module sets, from among the registered screen selection rules, the screen selection rule registered by the application designated as the operable subject as a screen selection rule to be applied for selecting a screen in the second layer L2. As described above, since the home application is first designated as an operable-subject application after the power is turned on, the screen selection module sets the home-application screen selection rule as a screen selection rule to be applied for selecting a screen in the second layer L2. Subsequently, when the user operates the scan button, the copy button, or the home button, the operable-subject application is updated. Then, from among the registered screen selection rules, the screen selection module sets the screen selection rule registered by the application designated as a new operable subject as a screen selection rule to be applied for selecting a screen in the second layer L2. When a display request for a screen corresponding to the second layer L2 is received from an application, the screen selection module selects a screen to be displayed in accordance with the screen selection rule set at that time point (i.e., by referring to the callback describing that screen selection rule).

Furthermore, the screen selection module has a subroutine that describes a default screen selection rule. If an application whose screen selection rule is not registered is designated as an operable subject, the screen selection module selects a screen to be displayed in accordance with the default screen selection rule. Moreover, if a display request for a screen corresponding to the first layer L1 is received from an application, the screen selection module selects a screen to be displayed in accordance with the default screen selection rule.

Next, specific examples of screen selection rules will be described.

Figure 11:
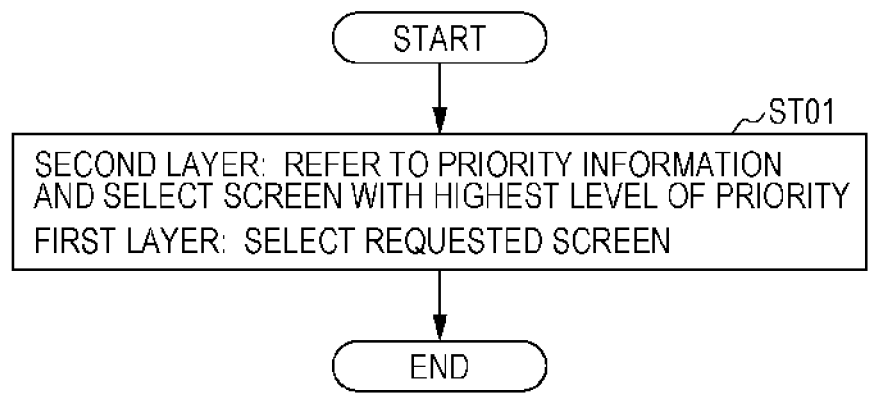
FIG. 11 illustrates a default screen selection rule.

FIG. 11 illustrates the default screen selection rule.
Step ST01
When a display request for a screen corresponding to the second layer L2 is received, the screen selection module adds screen information received from an application to the candidate list, refers to the priority information written in the candidate list, and selects the screen with the highest level of priority. If a display request for a screen corresponding to the first layer L1 is received, the screen selection module selects the requested screen in step ST01 as a screen to be displayed.

Figure 12:
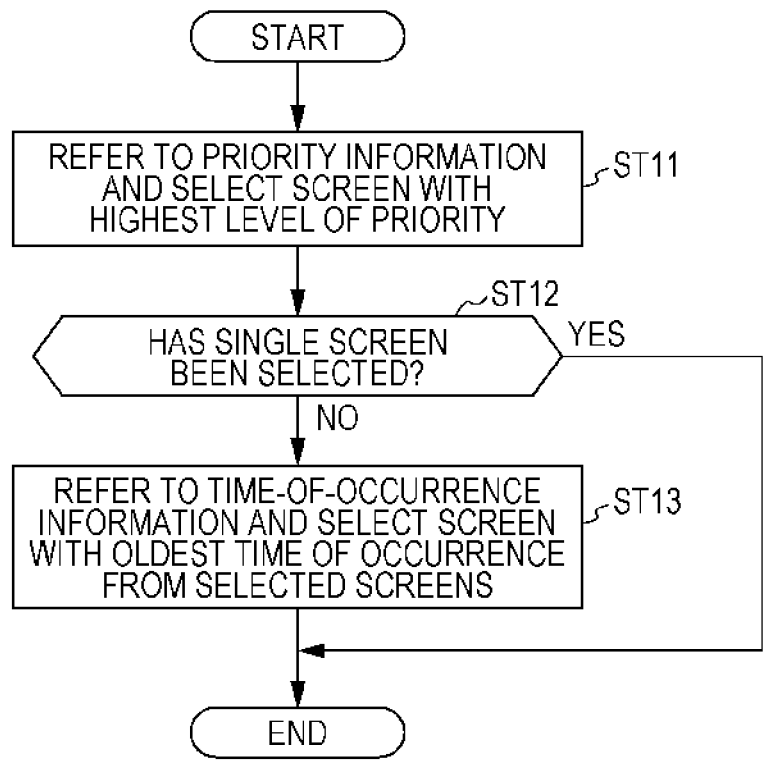
FIG. 12 illustrates a home-application screen selection rule.

FIG. 12 illustrates a home-application screen selection rule. The home-application screen selection rule is a screen selection rule in the second layer L2 registered in the screen selection module by the home application.
Step ST11
The screen selection module adds screen information received from an application to the candidate list, refers to the priority information written in the candidate list, and selects the screen with the highest level of priority.
Step ST12
The screen selection module determines whether or not a single screen has been selected in step ST11. If a single screen has been selected (YES in step ST12), the screen selection module ends the process. If two or more screens have been selected (NO in step ST12), the process of the screen selection module proceeds to step ST13.
Step ST13
The screen selection module refers to the time-of-occurrence information written in the candidate list and selects the screen with the oldest time of occurrence from the screens selected in step ST11.

Figure 13:
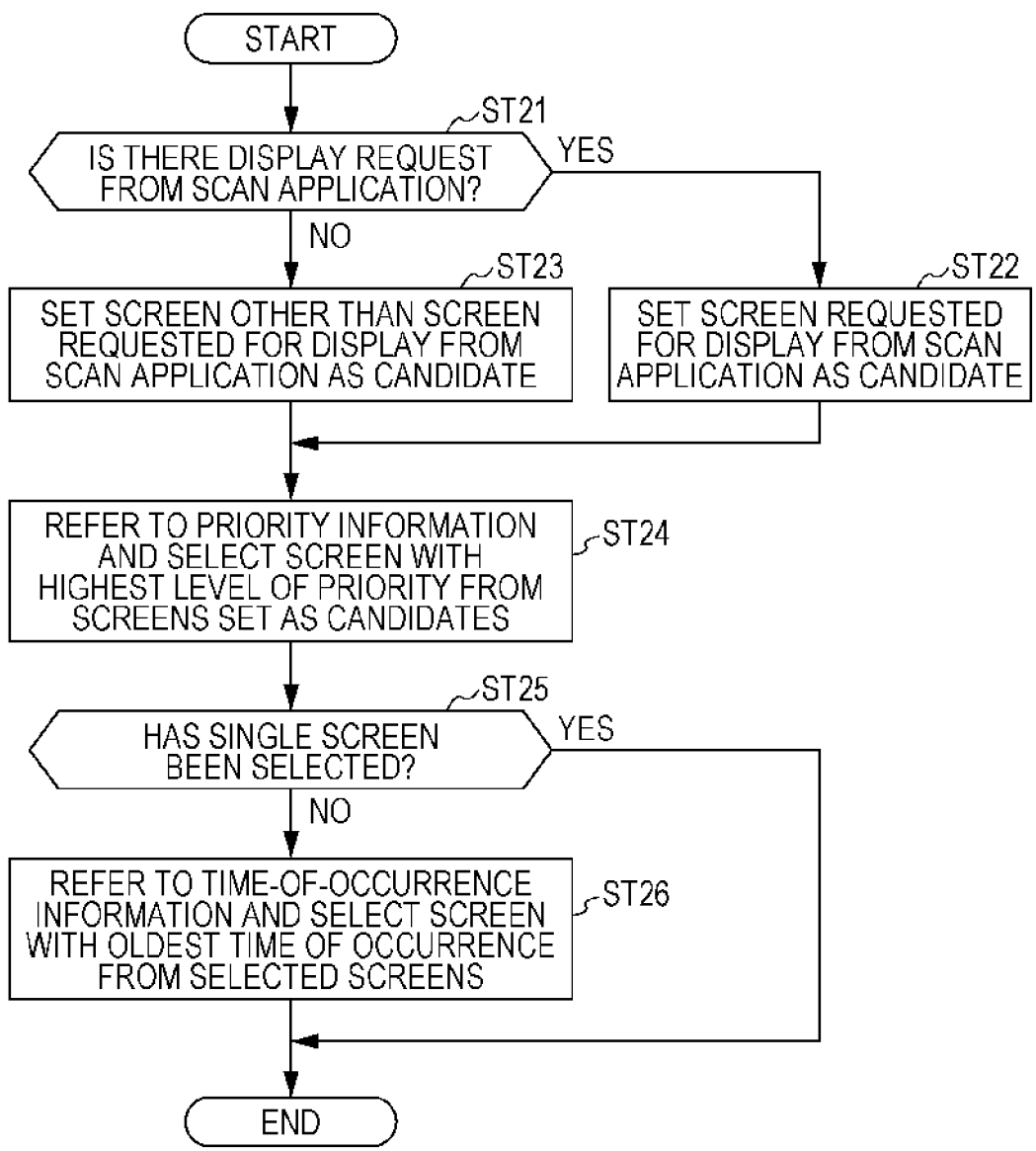
FIG. 13 illustrates a scan-application screen selection rule.

FIG. 13 illustrates a scan-application screen selection rule. The scan-application screen selection rule is a screen selection rule in the second layer L2 registered in the screen selection module by the scan application.
Step ST21
The screen selection module adds screen information received from an application to the candidate list, refers to the request-source information written in the candidate list, and determines whether or not there is a display request from the scan application as a request source. If there is request-source information about the scan application, it is determined that there is a display request from the scan application (YES in step ST21), and the process of the screen selection module proceeds to step ST22. If there is no request-source information about the scan application, it is determined that there is no display request from the scan application (NO in step ST21), and the process of the screen selection module proceeds to step ST23.
Step ST22
The screen selection module refers to the request-source information written in the candidate list and sets the screen requested for display by the scan application as a candidate for a screen to be displayed.
Step ST23
The screen selection module refers to the request-source information written in the candidate list and sets a screen other than the screen requested for display by the scan application as a candidate for a screen to be displayed.
Step ST24
The screen selection module refers to the priority information written in the candidate list and selects the screen with the highest level of priority from the screens set as candidates in step ST22 or ST23.
Step ST25
The screen selection module determines whether or not a single screen has been selected in step ST24. If a single screen has been selected (YES in step ST25), the screen selection module ends the process. If two or more screens have been selected (NO in step ST25), the process of the screen selection module proceeds to step ST26.
Step ST26
The screen selection module refers to the time-of-occurrence written in the candidate list and selects the screen with the oldest time of occurrence from the screens selected in step ST24.

If a screen has been selected in the above procedure, the screen selection module commands the rendering module to render the selected screen. In this case, the screen selection module sends information indicating the type of the selected screen and character-string information to the rendering module.

Because a copy-application screen selection rule is obtained by simply replacing the term "scan" with the term "copy" in the steps in the scan-application screen selection rule, a description and illustration thereof will be omitted here.

Next, the rendering module will be described. The rendering module ensures the image-data storage area, which corresponds to the number of pixels in the display surface of the display section 14, in the storage section 12. The rendering module has image data expressing a screen (i.e., the home screen, the scan setting screen, or the copy setting screen) corresponding to the first layer L1. When a command for a rending process of a screen corresponding to the first layer L1 is received from the screen selection module, the rendering module initializes the image-data storage area and stores image data subjected to the rendering process into the image-data storage area in accordance with the command from the screen selection module.

Furthermore, the rendering module has image data expressing a template for a screen (i.e., the scan error screen or the copy error screen) corresponding to the second layer L2. When a command for a rendering process of a screen corresponding to the second layer L2 is received from the screen selection module, the rendering module initializes the image-data storage area and stores image data of a previous screen corresponding to the first layer L1 into the storage area. Subsequently, the rendering module processes the image data of the template so that a character string indicated by character-string information received from the screen selection module is displayed, and then overwrites and stores this image data in the image-data storage area. A process performed by the rendering module for storing image data into the image-data storage area is called a rendering process. In other words, the rendering process is a process for setting image data expressing an image to be displayed on the display surface (i.e., an example of the setting unit 101).

When the rendering process is completed, the display section 14 displays a screen based on this image data on the display surface (i.e., an example of the display unit 105). When the user performs operation on the displayed screen, the reception section 15 receives this operation (i.e., an example of the reception unit 106). The controller 11 then controls each section of the copier 1 in accordance with the received operation so that a process according to the operation is executed (i.e., an example of the execution unit 107).

Because the shape and size of the screens are not uniformly set, there may be a case where a screen occupies the entire area of the display surface or a case where a screen partially occupies the display surface. The shape and size of a screen that partially occupies the display surface are also not uniform. Since image data of a screen corresponding to the second layer L2 is to be overwritten onto image data of a screen corresponding to the first layer L1, the screen corresponding to the second layer L2 is entirely displayed. In contrast, with regard to the screen corresponding to the first layer L1, only a part thereof that does not overlap the screen corresponding to the second layer L2 is displayed. In other words, the screen corresponding to the second layer L2 is displayed with priority over the screen corresponding to the first layer L1.

Operation

Figure 14:
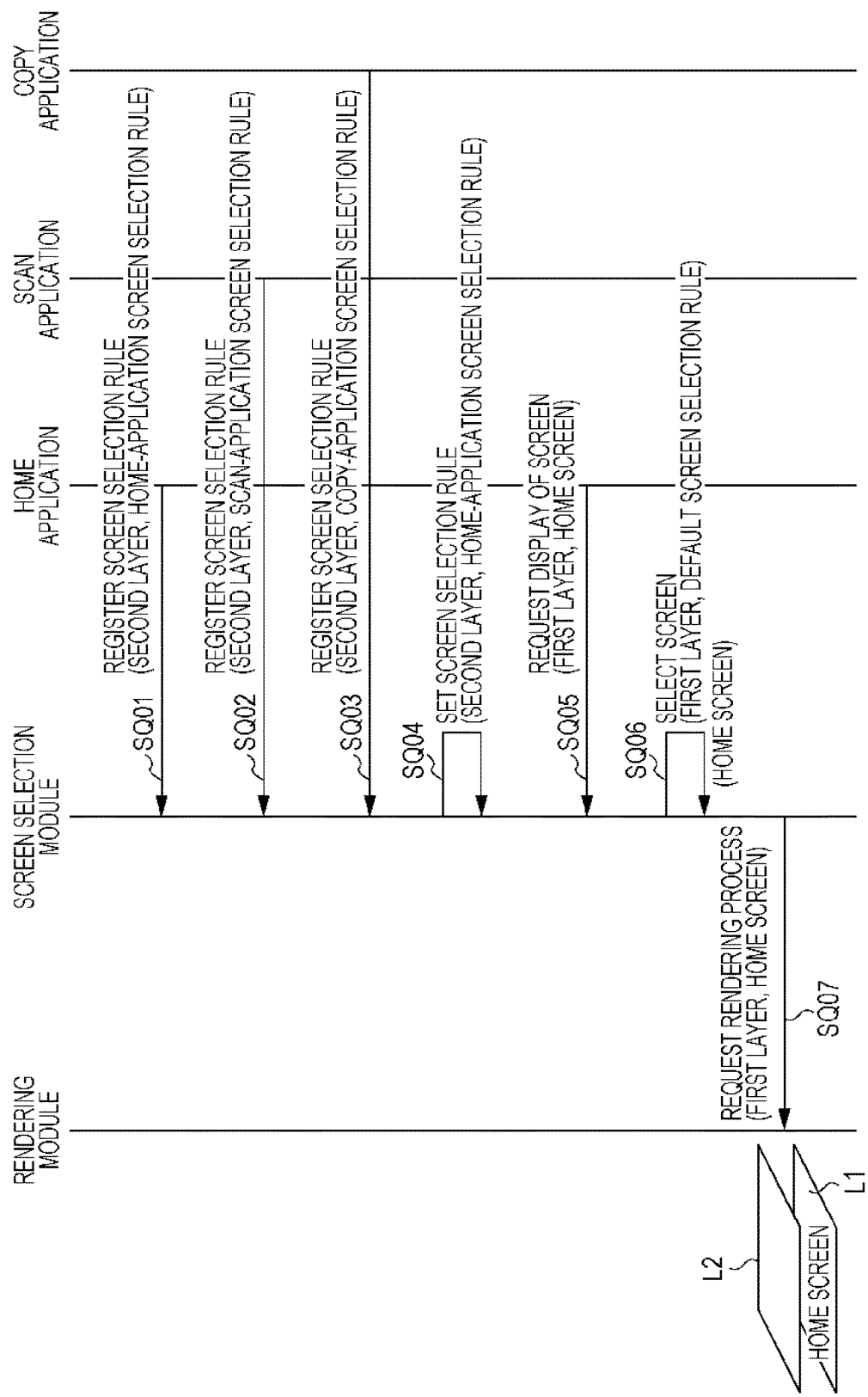

FIGS. 14 to 17 are sequence diagrams of operations executed by the display control program. Among these diagrams, the sequence diagram in FIG. 14 illustrates an operation performed when the power of the copier 1 is turned on.

Sequence SQ01
The screen selection module registers the home-application screen selection rule (see FIG. 12).

Sequence SQ02
The screen selection module registers the scan-application screen selection rule (see FIG. 13).

Sequence SQ03
The screen selection module registers the copy-application screen selection rule.

The order of the sequences SQ01, SQ02, and SQ03 may be different from this order.

Sequence SQ04
The screen selection module sets the home-application screen selection rule as a screen selection rule to be applied for selecting a screen in the second layer L2. Moreover, the screen selection module sets the default screen selection rule (see FIG. 11) as a screen selection rule to be applied for selecting a screen in the first layer L1.

Sequence SQ05
The home application sends a display request for the home screen to the screen selection module.

Sequence SQ06
The screen selection module selects a screen to be displayed. Specifically, since the home screen is a screen corresponding to the first layer L1, the screen selection module selects a screen to be displayed in accordance with the default screen selection rule set as a screen selection rule for the first layer L1. In this example, the home screen is selected.

Sequence SQ07
The screen selection module commands the rendering module to render the home screen. The rendering module initializes the image-data storage area and subsequently stores image data of the home screen. As a result, the home screen is displayed on the display surface. In this case, the operable-subject application is the home application.

Figure 15:
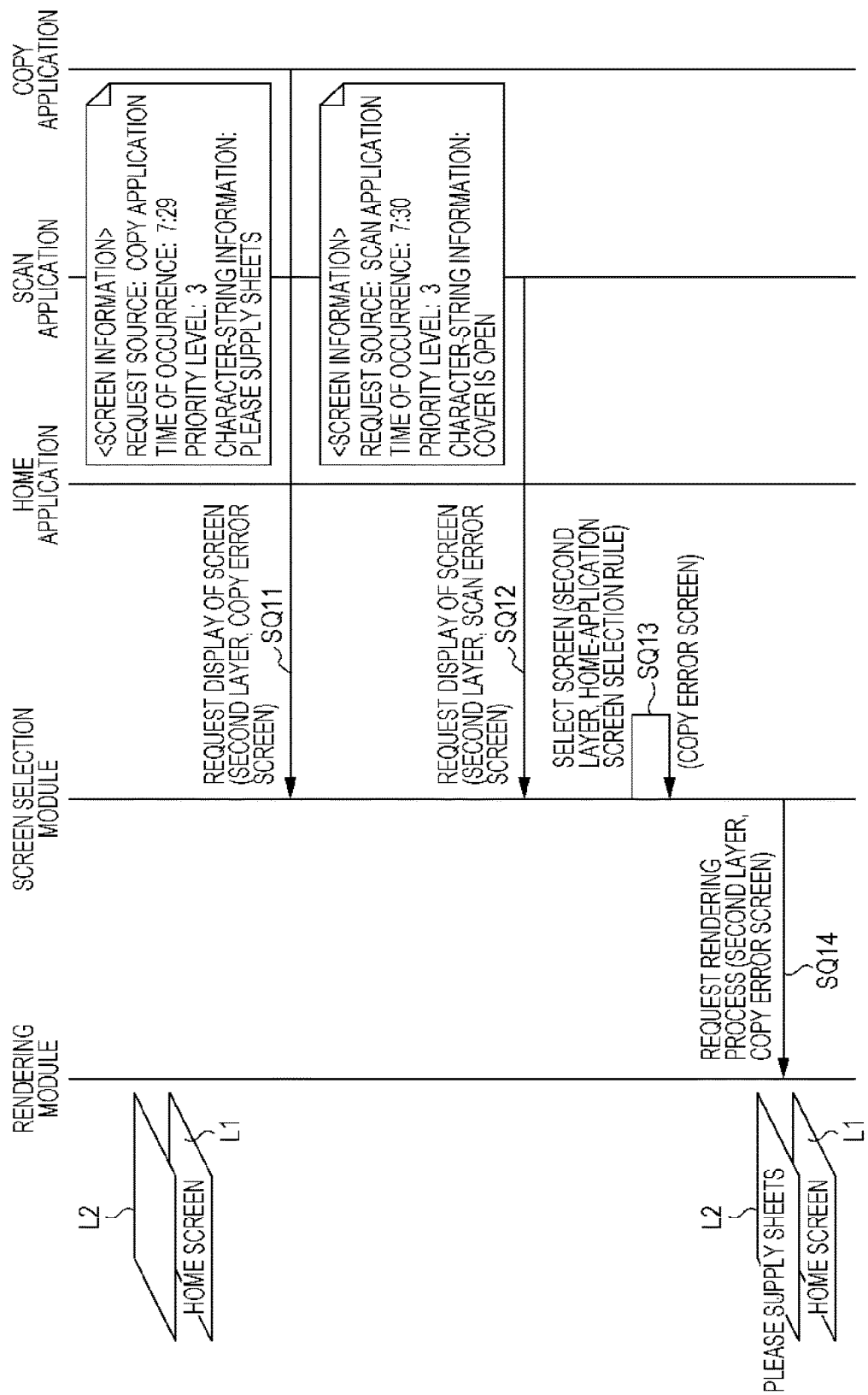
FIG. 15 is a sequence diagram illustrating an operation performed when there are errors occurring in multiple applications while the home screen is being displayed.

FIG. 15 is a sequence diagram illustrating an operation performed when there are errors occurring in multiple applications while the home screen is being displayed.

Sequence SQ11
For example, it is assumed that the sheet container is detected as being empty at 7:29. Then, the copy application generates screen information and sends the screen information and a display request for the copy error screen to the screen selection module. In this case, the request-source information indicates "copy application", the time-of-occurrence information indicates "7:29", and the character-string information indicates "please supply sheets". In this example, the priority information indicates "3".

Sequence SQ12
Next, it is assumed that another error has occurred before a screen is selected by the screen selection module. For example, it is assumed that the cover for document feed device is detected as being open at 7:30. Then, the scan application generates screen information and sends a display request for the scan error screen to the screen selection module. In this case, the request-source information indicates "scan application", the time-of-occurrence information indicates "7:30", and the character-string information indicates "cover is open". In this example, the priority information indicates "3".

Sequence SQ13
The screen selection module selects a screen to be displayed. In this example, since the home screen is being displayed (i.e., the operable-subject application is the home application), the home-application screen selection rule is set as a screen selection rule for the second layer L2. The candidate list has the screen information shown in FIG. 10A written therein. When referring to the priority information in step ST11, since the level of priority for both applications is 3, two error screens with the highest level of priority are selected. Then, a determination result of "NO" is obtained in step ST12, and the copy error screen with the older time of occurrence is selected in step ST13.

Sequence SQ14

The screen selection module commands the rendering module to render the copy error screen. In this case, the screen selection module sends the character-string information ("please supply sheets") of the copy error screen to the rendering module. The rendering module initializes the image-data storage area and then stores the image data of the previous screen (i.e., the home screen) corresponding to the first layer L1 into the storage area. Subsequently, the rendering module overwrites and stores the image data of the copy error screen having the character-string information disposed therein. As a result, the copy error screen having the error message "please supply sheets" disposed therein is displayed on the display surface.

Figure 16:
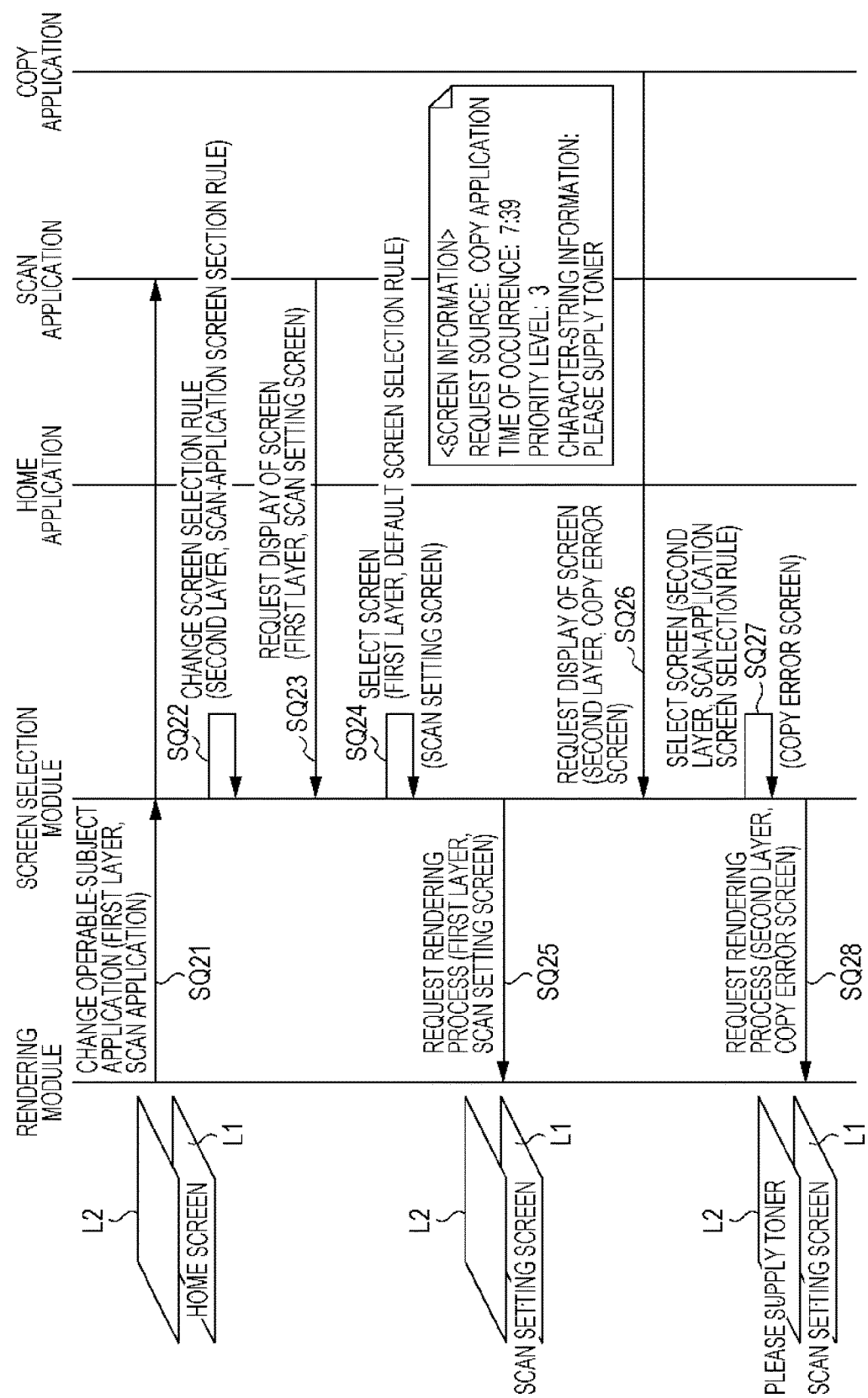
FIG. 16 is a sequence diagram illustrating an operation performed when there are errors occurring in multiple applications after an operable-subject application is changed by a user.
Figure 17:
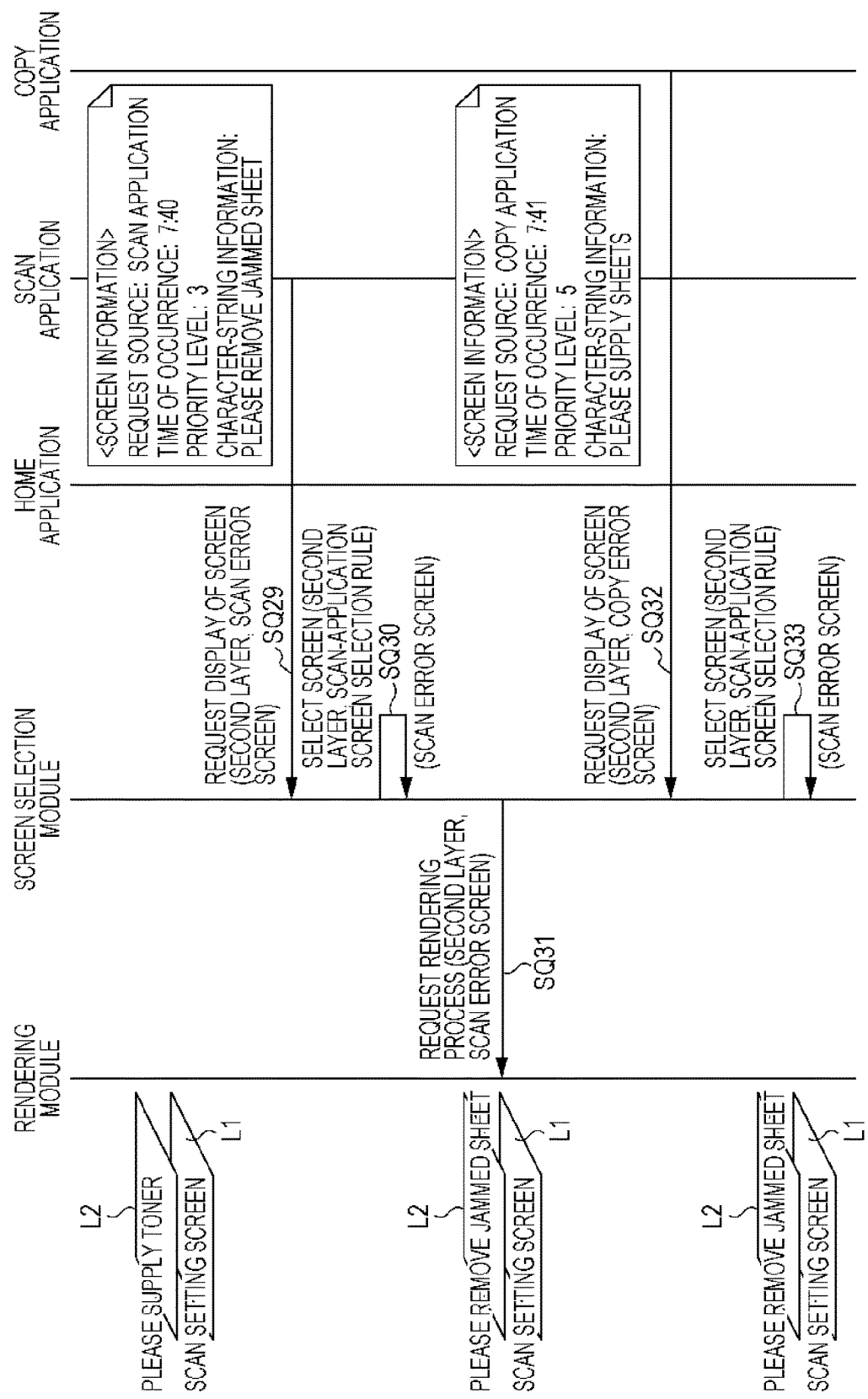
FIG. 17 is a sequence diagram illustrating an operation performed when there are errors occurring in multiple applications after the operable-subject application is changed by the user.

FIGS. 16 and 17 are sequence diagrams illustrating an operation performed when there are errors occurring in multiple applications after the operable-subject application is changed by the user. In this example, a state where there is no screen information written in the candidate list is the initial state.

Sequence SQ21

For example, it is assumed that the scan button is operated (i.e., the operable-subject application is changed to the scan application) by the user while the home screen is being displayed. Then, the display control program notifies the screen selection module and the scan application that the scan application has been designated as an operable subject.

Sequence SQ22

The screen selection module changes the screen selection rule to be applied for selecting a screen in the second layer L2 to the scan-application screen selection rule (see FIG. 13).

Sequence SQ23

The home application sends a display request for the scan setting screen to the screen selection module.

Sequence SQ24

The screen selection module selects a screen to be displayed. Specifically, since the scan setting screen is a screen corresponding to the first layer L1, the screen selection module selects a screen to be displayed in accordance with the default screen selection rule set as a screen selection rule for the first layer L1. In this example, the scan setting screen is selected.

Sequence SQ25

The screen selection module commands the rendering module to render the scan setting screen. The rendering module initializes the image-data storage area and subsequently stores image data of the scan setting screen. As a result, the scan setting screen is displayed on the display surface. In this case, the operable-subject application is changed to the scan application.

Sequence SQ26

Subsequently, it is assumed that a lack of toner is detected at 7:39. Then, the copy application generates screen information and sends the screen information and a display request for the copy error screen to the screen selection module. In this case, the request-source information indicates "copy application", the time-of-occurrence information indicates "7:39", and the character-string information indicates "please supply toner". In this example, the priority information indicates "3".

Sequence SQ27

The screen selection module selects a screen to be displayed. In this example, the scan-application screen selection rule is set in sequence SQ22. The candidate list has the screen information shown in FIG. 10B written therein. When referring to the request-source information, since there is no request-source information about the scan application, a determination result of "NO" is obtained in step ST21, and a screen requested for display from the copy application becomes a candidate in step ST23. This screen is selected also in step ST24, and a determination result of "YES" is obtained in step ST25. Then, the screen selection process ends.

Sequence SQ28

The screen selection module commands the rendering module to render the copy error screen. The rendering module initializes the image-data storage area and then stores the image data of the previous screen (i.e., the scan setting screen) corresponding to the first layer L1. Subsequently, the rendering module stores the image data of the copy error screen having the character string "please supply toner" disposed therein. As a result, this copy error screen is displayed on the display surface.

Sequence SQ29

Subsequently (see FIG. 17), it is assumed that a paper jam has occurred in the document feed device at 7:40. Then, the scan application generates screen information and sends the screen information and a display request for the scan error screen to the screen selection module. In this case, the request-source information indicates "scan application", the time-of-occurrence information indicates "7:40", and the character-string information indicates "please remove jammed sheet". In this example, the priority information indicates "3".

Sequence SQ30

The screen selection module selects a screen to be displayed. In this example, the scan-application screen selection rule is set in sequence SQ22. The candidate list has the screen information shown in FIG. 10C written therein. When referring to the request-source information, since there is request-source information about the scan application, a determination result of "YES" is obtained in step ST21, and a screen requested for display from the scan application becomes a candidate in step ST23. This screen is selected also in step ST24, and a determination result of "YES" is obtained in step ST25. Then, the screen selection process ends.

Sequence SQ31

The screen selection module commands the rendering module to render the scan error screen. The rendering module initializes the image-data storage area and then stores the image data of the previous screen (i.e., the scan setting screen) corresponding to the first layer L1. Subsequently, the rendering module stores the image data of the scan error screen having the character string "please remove jammed sheet" disposed therein. As a result, this scan error screen is displayed on the display surface.

Sequence SQ32

Subsequently, it is assumed that the sheet container is detected as being empty at 7:41. Then, the copy application generates screen information and sends the screen information and a display request for the copy error screen to the screen selection module. In this case, the request-source information indicates "copy application", the time-of-occurrence information indicates "7:41", and the character-string information indicates "please supply sheets". In this example, the priority information indicates "5".

Sequence SQ33

The screen selection module selects a screen to be displayed. In this example, the scan-application screen selection rule is set in sequence SQ22. The candidate list has the screen information shown in FIG. 10D written therein. When referring to the request-source information, since there is request-source information about the scan application, a determination result of "YES" is obtained in step ST21, and a screen requested for display from the scan application becomes a candidate in step ST23. This screen is selected also in step ST24, and a determination result of "YES" is obtained in step ST25. Then, the screen selection process ends. In this case, since there is no change in the selected screen, the screen selection module does not command the rendering module to perform a rendering process. Alternatively, the screen selection module may command the rendering module to perform a rendering process even when there is no change in the selected screen.

According to this exemplary embodiment, a screen is selected in accordance with a rule set in an application operating in the foreground. Therefore, if multiple applications request display of screens, a screen is selected without having to make the multiple applications operate in cooperation with each other. This may avoid complicated applications.

Furthermore, according to this exemplary embodiment, a screen is selected in accordance with a default screen selection rule even in a case where an application whose screen selection rule is not registered is operating in the foreground.

Modifications

The exemplary embodiment may be modified as follows. Moreover, multiple modifications may be combined.

First Modification

The selecting unit 104 may provide a notification of a selection result to an application that has requested display of a screen corresponding to the second layer L2. Specifically, if the screen selection module has completed selecting a screen corresponding to the second layer L2, a notification of whether or not the screen has been selected is provided to the application that has requested display of the screen. For example, when a notification indicating that the screen is selected is received, the application may resend the display request for the screen to the screen selection module after a predetermined time elapses from this notification.

Second Modification

The selecting unit 104 may provide a notification indicating that a screen is displayed to the application that has made a display request for the selected screen. Specifically, when the rendering process is completed, the screen selection module provides a notification indicating that the screen is displayed to the application that has made the display request for the selected screen. Since this screen corresponds to the second layer L2, a screen corresponding to the first layer L1 is partially or entirely not displayed. For example, the application may request the screen selection module to end the displaying of the screen after a predetermined time elapses from this notification.

Third Modification

Although an error screen is described as an example of a screen corresponding to the second layer L2 in the above exemplary embodiment, a screen corresponding to the second layer L2 does not have to be an error screen. For example, a screen corresponding to the second layer L2 may alternatively be a popup screen used for selecting an application to be executed when a universal serial bus (USB) memory is connected to the copier 1. As another alternative, a screen corresponding to the second layer L2 may be a screen that displays the progress of a process executed by an application. As another alternative, a screen corresponding to the second layer L2 may be a screen used for setting the sheet container when the sheet container is resupplied with sheets.

Fourth Modification

Although an image including the first layer L1 and the second layer L2 is displayed as an example in the above exemplary embodiment, an exemplary embodiment of the present invention may also be applied to a configuration that displays an image including three or more layers. A modification including three layers will be described here as an example. In addition to the configuration of the above exemplary embodiment, the configuration according to this modification displays an image including a third layer located in front of the second layer L2 in the viewing direction. The third layer corresponds to, for example, a screen that displays the progress of a process executed by an application. For each application, the screen selection module registers a screen selection rule in the third layer in addition to the screen selection rule in the second layer L2 (the screen selection rule in the second layer L2 and the screen selection rule in the third layer may be identical). When each application is to send a display request for a screen corresponding to the third layer to the screen selection module, the application generates screen information related to that screen and sends the generated screen information together with the display request to the screen selection module. In addition to the candidate list in the above exemplary embodiment (i.e., the candidate list for the second layer L2), the storage section 12 stores a candidate list for the third layer. If the screen selection module receives a display request for a screen from an application, the screen selection module determines a layer corresponding to the type of the screen and adds screen information to the candidate list for the determined layer. The procedure of the screen selection process for the third layer is similar to that of the screen selection process for the second layer L2.

Fifth Modification

In the above exemplary embodiment, the layer corresponding to the home screen, the scan setting screen, and the copy setting screen is described as an example of the first layer L1. Alternatively, a layer corresponding to the home screen may be provided behind the first layer L1 in the viewing direction. In this example, if one of the scan application and the copy application is designated as an operable subject (operating in the foreground), the screen selection rule of the application designated as the operable subject is set. If neither of the scan application and the copy application is designated as an operable subject, the home application becomes the operable subject (operating in the foreground), and the screen selection rule of the home application is set.

Sixth Modification

Although an example of the default screen selection rule is described in the above exemplary embodiment, the display control program may include multiple default screen selection rules that are different from each other, and an application may send an identifier that designates any of the default screen selection rules to the screen selection module.

Furthermore, a screen selection rule may be of any kind of rule, such as forcibly selecting a screen of a specific type when a display request for that screen is received.

Seventh Modification

In the above exemplary embodiment, the reception section 15 is described as having a function of a touchscreen as an example. Alternatively, a pointing device, such as a mouse, may be provided.

In the above exemplary embodiment, the above-described functions are realized by executing the display control program as an example. Alternatively, the above-described functions may be implemented by a hardware circuit. Furthermore, this program may be provided by being stored in a computer-readable storage medium, such as an optical storage medium or a semiconductor memory, and may be installed in the electronic apparatus by reading the program from this storage medium. Moreover, this program may be provided via an electrical communication line.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
    a hardware processor configured to execute:
        a setting unit configured to set image data expressing an image including a first layer corresponding to a first application operating in a foreground of a display and a second layer located in front of the first layer in a viewing direction of the display;
        an accumulation unit configured to accumulate a first screen, configured to operate the first application and a second application, displayed on the first layer and to accumulate a second screen configured to display an error on the second layer and requested to be displayed from a first application and a second application in response to an occurrence of the error of the first application or the second application;
        a registration unit configured to register a first rule, corresponding to the first application, with the second layer in response to an application which is operating being the first application, and the registration unit is further configured to register a second rule, corresponding to the second application, with the second layer in response to the application which is operating in the first layer being changed from the first application to the second application; and
        a selecting unit configured to select, according to the first rule or the second rule, the second screen to be displayed on the second layer.

2. The control device according to claim 1,
    wherein the selecting unit is further configured to select, if an application whose rule is not registered in the registration unit is operating in the foreground, a screen in accordance with a predetermined rule.

3. The control device according to claim 1,
    wherein the selecting unit is further configured to provide a notification of a selection result to an application that has requested display of the screen corresponding to the second layer.

4. The control device according to claim 1,
    wherein the selecting unit is further configured to provide, to the second application that has requested display of the second screen, a notification indicating that the second screen is displayed.

5. An electronic apparatus comprising:
    the control device according to claim 1, wherein the hardware processor is further configured to execute:
        a display unit configured to control display of a screen based on image data set by the setting unit;
        a reception unit configured to receive an operation on the screen displayed by the display unit; and
        an execution unit configured to execute a process in accordance with the operation received by the reception unit.

6. The control device according to claim 1, wherein the first layer is displayed and the second layer is not displayed, and
    the selecting unit is further configured to control, in response to both an error of the first application and an error of the second application occurring and according to the first rule or the second rule, the first screen to be rendered and not displayed in the second layer while the second screen is rendered and displayed in the first layer.

7. The control device according to claim 1, wherein the first layer is displayed and the second layer is not displayed, and
    the selecting unit is further configured to control, in response to both an error of the first application and an error of the second application occurring and according to the first rule or the second rule, the second screen to be displayed in response to the error of the second application occurring before the error of the first application.

8. The control device according to claim 1, wherein the second screen entirely fills the display.

9. The control device according to claim 1, wherein the first application is one of a home application, a scan application and a copy application, and
    wherein the second application is another one of the home application, the scan application and the copy application.

10. The control device according to claim 1, wherein the at least one hardware processor is further configured to implement:
    predetermining the second layer as configured to display the error without display in the second layer of the first application and the second application, and
    predetermining the first layer as configured to display in the first layer the first application and the second application without display in the first layer of the error.

11. The control device according to claim 1,
    wherein the hardware processor is further configured to implement:
        maintaining priorities of error messages respective to ones of the first application and the second application, and
        control an error message of the second application to be displayed on the second layer and another error message of the first application to not be displayed on the second layer, in a case that both first application and the second application simultaneously attempt to control ones of the error message and the another error message to be displayed on the second layer, in response to determining both:

that a priority of another error message of the first application has a greater priority than a priority of the error message of the first application, and that the second rule is selected by the selecting unit.

12. A non-transitory computer readable medium storing a program configured to cause a computer to execute a control process, the control process comprising:

setting image data expressing an image including a first layer corresponding to a first application operating in a foreground of a display and a second layer located in front of the first layer in a viewing direction of the display;

accumulating a first screen, configured to operate the first application and a second application, displayed on the first layer and to accumulate a second screen configured to display an error on the second layer and requested to be displayed from a first application and a second application in response to an occurrence of the error of the first application or the second application;

registering a first rule, corresponding to the first application, with the second layer in response to an application which is operating being the first application, and registering a second rule, corresponding to the second application, with the second layer in response to the application which is operating in the first layer being changed from the first application to the second application; and selecting, according to the first rule or the second rule, the second screen to be displayed on the second layer.

13. A control device comprising:

a hardware processor configured to execute:

a setting unit configured to set image data expressing an image including a first layer corresponding to a first application operating in a foreground of a display and a second layer located in front of the first layer in a viewing direction of the display;

an accumulation unit configured to accumulate information related to a second screen that corresponds to the second layer requested for the display from a second application and for which the display is not completed;

a registration unit configured to register a first rule of the first application, the first rule comprising a first priority of a first screen indicating an error of the first application, and the registration unit is further configured to register a second rule for the second application, the second rule comprising a second priority of a second screen indicating an error of the second application; and a selecting unit configured to select the second screen corresponding to the second layer and to control, in response to both the error of the first application and the error of the second application occurring, the first screen not to be displayed and the second screen to be displayed in response to the second priority of the second screen being greater than the first priority of the first screen, wherein the first layer is displayed and the second layer is not displayed, and the selecting unit is further configured to control, in response to both the error of the first application and the error of the second application occurring and the second priority being greater than the first priority, the first screen to be rendered and not displayed in the second layer while the second screen is rendered and displayed in the first layer.

* * * * *